US007139226B2

(12) United States Patent
Haas et al.

(10) Patent No.: US 7,139,226 B2
(45) Date of Patent: Nov. 21, 2006

(54) LONG TERM RAPID COLOR CHANGING TIME INDICATOR

(75) Inventors: David J. Haas, Suffern, NY (US); Robert J. Holt, Cornwall, NY (US); Leonard H. Davis, New City, NY (US)

(73) Assignee: Brady Worldwide, Inc., Milwaukee, WI (US)

( * ) Notice: Subject to any disclaimer, the term of this patent is extended or adjusted under 35 U.S.C. 154(b) by 343 days.

(21) Appl. No.: 10/786,449

(22) Filed: Feb. 25, 2004

(65) Prior Publication Data

US 2005/0185520 A1 Aug. 25, 2005

(51) Int. Cl.
*G04B 17/00* (2006.01)
*G01N 31/22* (2006.01)

(52) U.S. Cl. ....................................... 368/327; 116/200

(58) Field of Classification Search ................ 368/114, 368/327; 116/200, 207, 217, 300; 422/56–58, 422/61

See application file for complete search history.

(56) References Cited

U.S. PATENT DOCUMENTS 4,154,107 A 5/1979 Giezen et al.
4,212,153 A 7/1980 Kydonieus et al.
4,903,254 A 2/1990 Haas
5,045,283 A 9/1991 Patel
5,058,088 A 10/1991 Haas et al.
5,085,802 A 2/1992 Jalinski
5,182,212 A 1/1993 Jalinski
5,215,956 A 6/1993 Kawashima
5,446,705 A 8/1995 Haas et al.
5,602,804 A 2/1997 Haas
5,633,835 A 5/1997 Haas et al.
5,633,836 A 5/1997 Langer et al.

(Continued)

OTHER PUBLICATIONS

Pasco Santurri et al., "4,4"-Diaminoazobenzene in Organic Syntheses, Collective vol. 5, John Wiley and Sons, pp. 341-343, 1973.

(Continued)

*Primary Examiner*—Kamand Cuneo
*Assistant Examiner*—Jeanne-Marguerite Goodwin
(74) *Attorney, Agent, or Firm*—Quarles & Brady LLP

(57) ABSTRACT

A long term rapid color changing time indicator includes a front part and a back part. The front part includes a transparent layer, an opaque layer, a colorant layer, and a neutralizing layer. The colorant layer includes a matrix and a colorant having a non-migratory form that does not migrate in the matrix and having a migratory form that migrates in the matrix. The back part has a reactant. When the front part and the back part are placed in contact, the reactant migrates into the neutralizing layer and a portion of the reactant is depleted by a coreactant. The unreacted reactant migrates into the colorant layer and reacts with the non-migratory form of the colorant converting the non-migratory form to the migratory form such that the migratory form of the colorant migrates through the opaque layer to cause a visual color indication in the transparent layer.

23 Claims, 1 Drawing Sheet

U.S. PATENT DOCUMENTS

| | | | |
|---|---|---|---|
| 5,756,356 | A | 5/1998 | Yanagi et al. |
| 5,822,280 | A | 10/1998 | Haas |
| 6,214,623 | B1 | 4/2001 | Simons et al. |
| 6,254,969 | B1 | 7/2001 | Eberle |
| 6,295,252 | B1 | 9/2001 | Holt et al. |
| 6,452,873 | B1 | 9/2002 | Holt et al. |
| 6,514,462 | B1 | 2/2003 | Simons |
| 6,544,925 | B1 | 4/2003 | Prusik et al. |
| 2003/0053377 | A1 | 3/2003 | Spevacek |
| 2003/0151985 | A1 | 8/2003 | Braunberger |

OTHER PUBLICATIONS

Green et al., "The Ionamines: A New Class of Dyestuffs for Acetate Silk", Journal of the Society of Dyers and Colourists, 39, 11-16, (1923).

Bucherer et al., "Ueber Aldehyde-Bisulfite und Hydrosulfite", Chemische Berichte, 39, 2814-2823, (1906).

Neelakatan et al., "alpha-Aminoalkanesulfonic Acids", Journal of Organic Chemistry, 24, 1943-1948, (1959).

LONG TERM RAPID COLOR CHANGING TIME INDICATOR

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to a time indicator and, in particular, to a long term time indicator which provides a rapid and clear indication of expiration.

2. Description of the Related Art

Numerous devices are known which provide, after activation, a visual indication of the passage of a predetermined amount of time. Such a time indicator is useful, for example, as a security badge, as an indicator of the length of time a perishable item has been on the wholesaler's or retailer's shelf and for numerous other uses.

Some known time-indicating devices involve the migration of a colorant, dye or other material through a media. Many of these known time indicators, which are generally short term time indicators, are based on the migration of ink from one substrate through another substrate, i.e., in a path perpendicular to the surface of the substrate. After the ink diffuses for a time period through the substrate(s), it is viewed on a display surface to thereby indicate that the predetermined time has elapsed.

Examples of this diffusion technology can be found in: U.S. Pat. No. 4,212,153 which describes a time indicator where a dye migrates to the surface of an indicator badge; U.S. Pat. Nos. 5,446,705 and 4,903,254 which describe the use of an ink dissolver layer in a time indicator; U.S. Pat. No. 5,058,088 which describes the concept of varying ink dot size and spacing to change the time indication period; U.S. Pat. No. 5,602,804 which describes a time indicator with control of lateral migration; U.S. Pat. Nos. 5,633,835 and 5,822,280 which describe the use of an organic liquid to dissolve a barrier layer and allow for dye migration; U.S. Pat. No. 6,295,252 which describes the use of an accelerator in an adhesive layer; U.S. Pat. No. 6,452,873 which discloses the enablement of dye migration by use of a plasticizer, U.S. Pat. No. 6,514,462 which describes the use of rubber polymers as the diffusion layer in a time-temperature indicator; and U.S. Patent Application Publication No. 2003/0053377 which describes the migration of an amorphous material into a porous matrix when the materials are brought together.

Technologies based on dye diffusion are typically useful for short time intervals such as days or weeks. They are usually not useful for longer time intervals such as months because the color change occurs by gradual dye diffusion which begins the instant the activating adhesive cover is applied over these printed dyes. The time indicator may stay pure white for about a month and then start to gradually change color. During the time interval of gradual color change, the time indicator is in a "gray area" between absolutely YES and absolutely NO. This lack of a sharp transition time is a problem with simple dye diffusion systems.

Other indicators in the prior art rely primarily upon chemical reactions to cause a visually perceptible change over a desired time period rather than merely the migration of fluids or compounds. U.S. Pat. No. 5,045,283 lists various color change reactions that are suitable for time indicator devices. In one example, U.S. Pat. No. 5,045,283 describes the use of acid or base reactant depletion before trigger of an indicator or to control diffusion. U.S. Pat. Nos. 5,085,802 and 5,182,212 also describe the concept of acid or base reactant depletion before trigger of an indicator. U.S. Pat. No. 6,254,969 describes the similar concept of oxygen depletion before trigger of an indicator. U.S. Pat. No. 6,544,925 discloses the use of co-reactants for color formation in a time-temperature indicator system.

The aforedescribed devices are often complicated to adjust for a selected period of time. Adjustments often involve experimentation with many types of chemicals, inks, solvents, etc. to prepare a device which can operate under the conditions expected. Most of the prior art devices gradually change color over a period of time and involve, at best, a guess on how much time has elapsed. When this is combined with the possible variations in temperature, humidity, etc. that may exist in the environment of the time indicator, the viewer may have very little confidence that he is close to the expiration time of the device.

Therefore, there remains a need for a long term time indicator wherein the dye does not begin to appear until the end or near the end of the time interval. Such a time indicator would remain unchanged (white or clear) until near the end of the time interval, and then the color would rapidly or, ideally, instantaneously appear. In essence, what is desirable is a time switch (a color-appearing step-function from white to dark), which stays white until the end of the time interval and then produces a step-function, meaning an instantaneous or rapid color change to clearly show that the time interval has ended. The time indicator would solve the problems with longer term indicators that suffer from an extended "gray time" where there is a slow change in the indication color. The time indicator would allow for a reduced "gray time" for a longer term indicator.

SUMMARY OF THE INVENTION

The foregoing needs are met by a time indicator according to the invention. The time indicator rapidly changes color after a specified time. The time indicator system includes: a back part having a base substrate and a migrating reactant in or on the base substrate; and a front part having a timing layer, a neutralizing layer, a colorant layer, an opaque layer, a transparent adhesive enhancement layer, and a transparent front substrate.

When the time indicator is activated by placing the timing layer of the front part and the reactant of the back part in contact, the reactant begins to migrate through the timing layer and to the neutralizing layer at a known rate. In one form, the neutralizing layer contains a counter pH agent that neutralizes the reactant. The timing layer is optional and may be needed for controlling the migration rate of the reactant and to extend or vary the timing as needed by the application. There is an excess of reactant compared to the neutralizing agent. The reactant migrates to the neutralizing layer and the acid or base is neutralized by the neutralizing agent. After the neutralizing agent is depleted, the reactant migrates to the colorant layer. The colorant layer has a colorant in a matrix. The colorant has a non-migratory form in which the colorant does not migrate in the matrix and a migratory form in which the colorant migrates in the matrix.

The reactant combines with the non-migratory form of the colorant and converts the colorant to its migrating form. After conversion, the colorant migrates through the colorant layer and the opaque layer and can be seen by the user in the transparent front substrate.

The time indicator according to the invention rapidly changes from a secure to an unsecure state (i.e., a color change is visible) after a well-defined delay time. In order to accomplish this, the timing control (induction time or delay period) and color change mechanisms (the rate of switching to an "alarm" state) are independently controlled. Previous devices used the timing control process and the color changing process to be the same. This invention separates the timing process and the color changing process. The time indicator is a three-step process. First is the activation process, followed by the timing process and then the color changing process. The activation process is a separate process, which is started by the end user, activated by allowing the front and back parts of the time indicator to come together. Indicators in which the timing process and the color changing process are combined have indications that are not very clear to the user, that is, a gradual color appearance. Very problematic are prior indicators of long periods wherein the timing process is as long as the color change process, making it difficult to distinguish a clear endpoint. Prior devices where a visual message becomes either visible or obscured are based on diffusion of a dye or an activator, which controls both the timing control process and the color changing process. The present invention overcomes these difficulties. The mechanism for the color change is separate from the mechanism to impart a time delay period so that the colorant remains immobilized until contacted by the reactant, which then allows the colorant to migrate very rapidly through the opaque layer and be seen by the end user.

It is therefore an advantage of the present invention to provide a long term time indicator wherein the dye does not begin to appear until the end or near the end of the time interval.

It is another advantage of the present invention to provide a time indicator that remains unchanged (white or clear) until near the end of the time interval, and then the color rapidly or instantaneously appears.

It is yet another advantage of the present invention to provide a time indicator that acts as a time switch with a color-appearing step-function from white to dark to clearly show that a time interval has ended.

It is still another advantage of the present invention to provide a time indicator that utilizes separate timing control and color change mechanisms to eliminate the problems associated with gradual color change in longer term time indicating devices.

These and other features, aspects, and advantages of the present invention will become better understood upon consideration of the following detailed description, drawings, and appended claims.

DETAILED DESCRIPTION OF THE INVENTION

Figure 1:
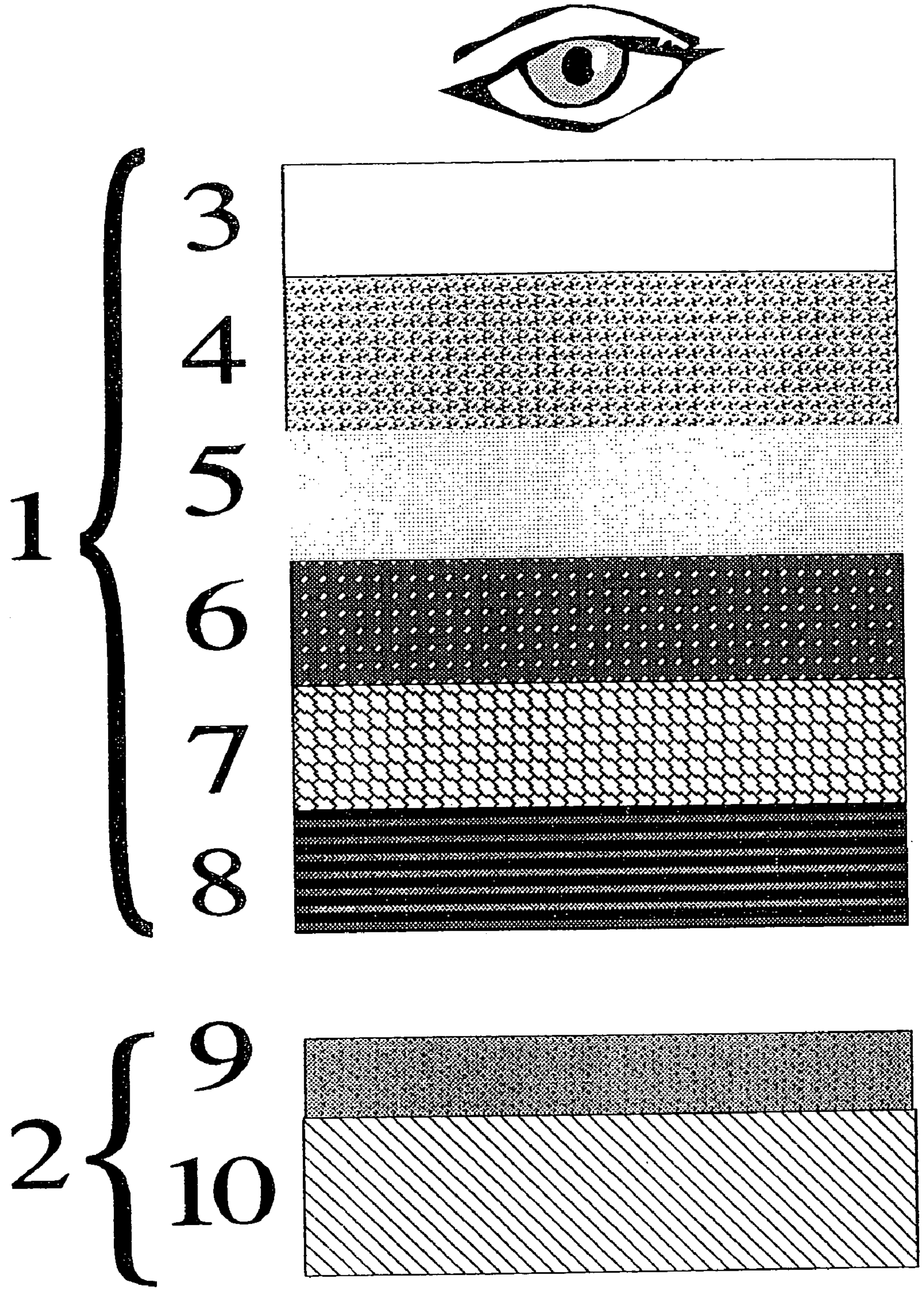
FIG. 1 shows a cross-sectional view of one embodiment of a time indicator according to the invention prior to activation.

The present invention is directed to a time indicator that utilizes separate timing control and color change mechanisms. It utilizes either acid-base or oxidation-reduction reactants to migrate into and neutralize in a separate layer and then the excess migrates further, reacting with a non-migrating colorant. The non-migrating colorant reacts to a migrating colorant which then migrates through an opaque layer to a display layer. Utilizing this approach, an indicator can be made which allows for longer time periods (e.g., about 30 to 60 days) until initial readability with a distinct end point.

Turning now to FIG. 1, there is shown an example embodiment of a time indicator according to the present invention. The time indicator is provided in two parts, a front part (activator) 1 and a back part 2. The term "front" part is used herein to indicate the part which is viewed by an end user and does not limit the orientation of the time indicator in space. The front part 1 includes a transparent substrate 3 or sheet such as polyester or acetate film. Attached to one side of the transparent substrate 3 is a transparent adhesive referred to as the enhancement layer 4. Together the transparent substrate 3 and the enhancement layer 4 form a transparent layer. Attached to the enhancement layer 4 is an opaque layer 5 which functions to hide a colorant that is contained in the attached colorant layer 6. The colorant layer 6 includes a colorant (e.g., dye molecule) that does not migrate in its initial non-migratory form in the matrix comprising the colorant layer 6. After a predetermined time and a reaction, this colorant will change form and become a migrating colorant. The layer adjacent and attached to the colorant layer 6 is a neutralizing layer 7. The bottom layer of the front part 1 is a timing layer 8. The timing layer 8 may not be required if the timing is sufficient without the timing layer 8. The timing layer 8 may be an adhesive layer and/or the neutralizing layer 7 may be an adhesive layer used to attach it to the reactant layer 9 described below. An optional release liner may be attached over the timing layer 8 or the neutralizing layer 7 for ease of handling before activation.

The back part 2 consists of a base substrate 10 such as paper or polymer film. On one side of the base substrate 10 is a reactant layer 9. This layer 9 contains a migrating reactant such as an acid or base that migrates upward into the front part 1. The reactant layer 9 may be a continuous layer of the migrating reactant or may comprise discrete or dispersed regions of the migrating reactant. If the last bottom layer in the front part 1 is not an adhesive layer, then reactant layer 9 includes an adhesive. An optional release liner may be attached over the reactant layer 9 for ease of handling before activation.

Upon activation, the timing layer 8 of the front part 1 is placed into contact with the reactant layer 9 of the back part 2. The migrating reactant in reactant layer 9 will gradually migrate through the timing layer 8 into the neutralizing layer 7. At the neutralizing layer 7, the migrating reactant will react with a neutralizing agent in the neutralizing layer 7. The neutralizing agent is in an opposite form (coreactant) than the migrating reactant. If the reactant is an acid, then the neutralizing agent is a base or vice versa. The result of the reaction of the reactant and coreactant is a neutral reaction product. The reactant continues to migrate in the neutralizing layer 7 at a known rate. After a specified time, the neutralizing agent is depleted. The reactant will then be able to migrate into the colorant layer 6. Thus, diffusion of the reactant through the timing layer 8 and the neutralizing layer 7 provides a timing control mechanism.

Once the reactant meets a non-migrating colorant in the colorant layer 6 and reacts, the colorant will change form. The colorant will change from a non-migrating colorant to a migrating colorant. The colorant can change by several means such as: acid/base neutralization, oxidation/reduction reaction, or similar reaction. The preferred reaction is an acid/base neutralization. After the colorant is converted to a migrating colorant, it will migrate through the colorant layer 6, the opaque layer 5 and into the enhancement layer 4 and be seen by the end user as a change in color.

An example of a time switch time indicator according to the invention includes the following for the front part 1: transparent substrate 3 comprising a transparent polymeric film; enhancement layer 4 comprising a transparent adhesive; opaque layer 5 including a colored adhesive; colorant layer 6 including an ionomer dye in a polymeric matrix; neutralizing layer 7 including an acid in an adhesive; and timing layer 8 including an adhesive. The back part 2 includes: reactant layer 9 including a migrating reactant with a basic pH in an adhesive; and a base substrate 10 comprising paper or polymer film, which may have an adhesive (and optional associated removable release liner) on the bottom side for adhering to objects.

A preferred example of a time switch time indicator (approximately 30–60 days to initial readability) includes the following for front part 1: transparent substrate 3 comprising clear PET (polyester) film; enhancement layer 4 comprising a clear layer including an adhesive commercially available as H&N 213 pressure sensitive adhesive—1 mil thick dry; white opaque layer 5 including commercially available Morton 1106V $TiO_2$ in H&N 213 pressure sensitive adhesive (59.7%)—1 mil thick dry; colorant layer 6 including an ionomer dye, propylene glycol and a matrix of a pressure sensitive adhesive commercially available as Duro Tak 80-1100 from National Starch and Chemical Company, Bridgewater N.J., USA—1 mil dry; neutralizing layer 7 including para-toluene sulfonic acid, propylene glycol and Duro Tak 80-1100 pressure sensitive adhesive—1 mil dry; and timing layer 8 including propylene glycol and Duro Tak 80-1100 pressure sensitive adhesive—1 mil dry. The back part 2 includes: reactant layer 9 including a 2-amino-2-ethyl-1,3-propanediol (AEDP) (base) migrating reactant in Duro Tak 80-1100 pressure sensitive adhesive—1 mil dry; and a base substrate 10 comprising paper or polymer film.

Various colorants may be used in the time indicator of the invention. The term colorant, used here, has a broad meaning in that it is a substance that has color or that can combine with another component and develop a new color. The colorant can be: hydrophilic or hydrophobic dyes, pigments, leuco dyes, dye intermediates, pH indicators, reactive dyes or any color formers.

There are many ways that color can be formed after reacting with a reactant. These systems involve the migration of a component through the opaque layer. After migration of the component, a second component or components could react, interact, or combine to form a color change. Many different color change mechanisms can be used and are known throughout the art. Examples of the color changing mechanisms are: pH indicators, oxidation or reduction of a colorant, substitution reactions, elimination reactions, acid/base reactions, metal ion complexation, photosensitive reaction, decomposition reactions, or any other reaction and interaction known in the art. These mechanisms can involve the use of many different materials and colorants such as: reactive dyes, dye intermediates, leuco dyes, and other commercially available dyes.

One way that the color can appear in the time indicator of the invention is with the use of the opaque layer 5 that initially conceals the colorant in the colorant layer 6. After the colorant is converted from the non-migratory form to the migratory form, the migratory form of the colorant can migrate into the opaque layer 5 and enhancement layer 4, revealing the color. In order to see the color, the opaque layer 5 should have a color different from the color of the colorant when in the opaque layer 5 or when at the surface of the opaque layer 5.

One preferred non-migrating form of the colorant is an ionomer prepared from a dye called Disperse Orange 3. This type of colorant is referred to as an ionomer dye. The dye in this form does not migrate in the preferred medium of the colorant layer 6. The synthesis of this colorant in an ionamine form and similar others is as follows:

Ionamine - Scheme 1

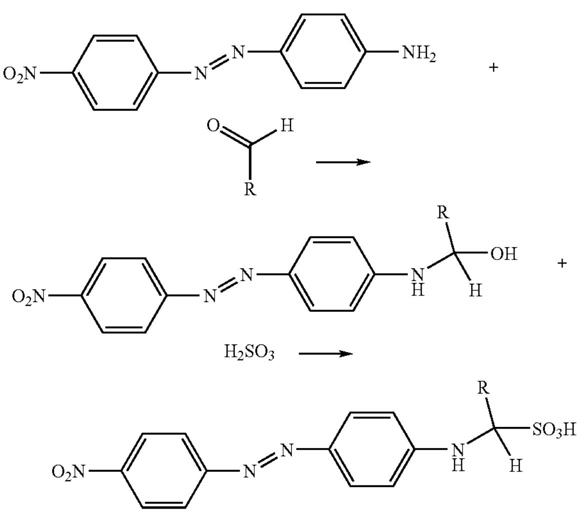

Ionamine

Ionamine Scheme 2

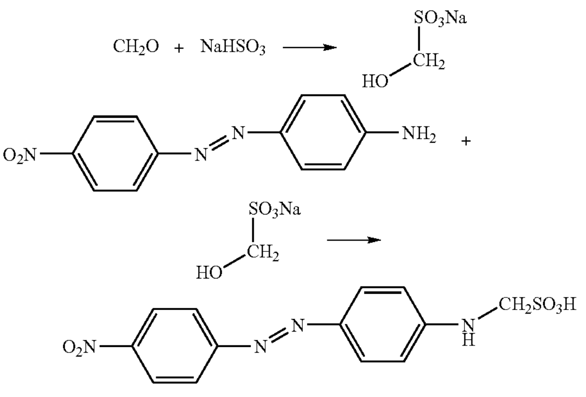

Ionamine 2

Side Products

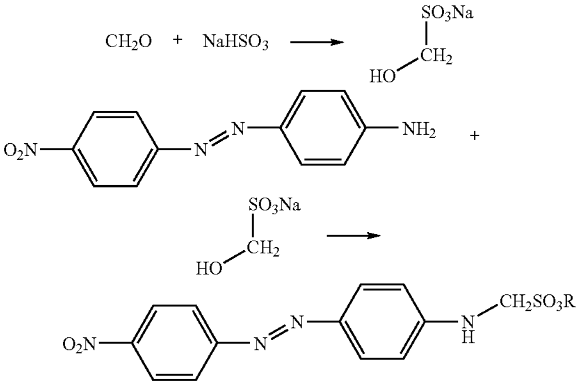

R = H or Na

Ionamine, Major Product ref. Journal of the Society of Dyers and Colourists, 39, 11–16 (1923) Green and Saunders, "The Ionamines: A New Class of Dyestuffs for Acetate Silk"

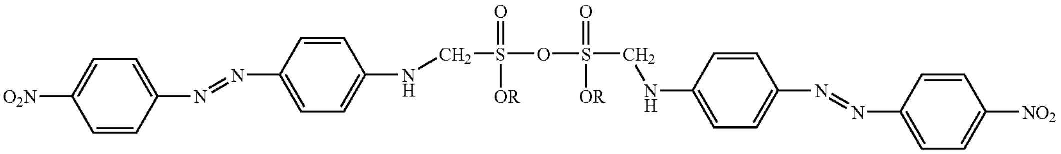

R = H or Na

Anhydro Dimer ref. Chemische Berichte, 39, 2814–2823 (1906) Bucherer and Schwalbe, "Ueber Aldehyde-Bisulfite und Hydrosulfite"

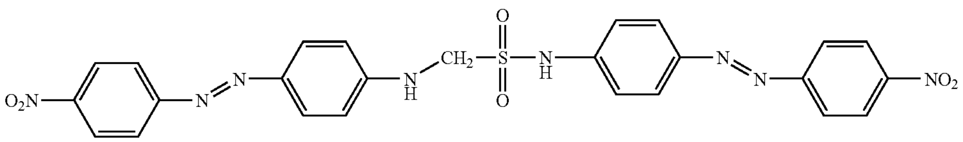

Rearrangement Product ref. Journal of Organic Chemistry, 24, 1943–1948 (1959) Neelakatan and Hartung "alpha-Aminoalkanesulfonic Acids"

This ionamine colorant, after being converted with a base (such as AEDP) yields a dye that migrates in the preferred medium of the colorant layer 6. Certain migratory dyes may be one color under a neutral environment, and when the dye migrates to the opaque layer 5 and the enhancement layer 4 and these layers are acidic in nature, the color will change toward a different color. The opaque layer 5 and the enhancement layer 4 can also be neutral in pH such that the final color seen is the original color of the migratory dye. Different colors can be produced if the base (chromophore) of the ionomer dye is changed. There are many other dyes that can be produced into ionomer dyes by the reaction schemes listed above. The preferred dye color is orange but there are several other dyes known in the art that can be used as the colorant in the colorant layer 6. Examples of red dyes that can be used are: Disperse Red 60, Disperse Red 4, Disperse Red 11, Disperse Red 15, Disperse Red 91, Solvent Red 5, and Disperse Violet 17.

Various neutralizing agents (coreactants) can be used in the neutralizing layer 7. In particular, the neutralizing agent contains any coreactant that reacts with the migrating reactant. In one form, the neutralizing agent is of opposite pH to the migrating reactant. The coreactant in the neutralizing layer 7 prevents the migrating reactant from entering the colorant layer 6 and reacting with the colorant until the coreactant is depleted. The reaction can be a typical acid/base reaction, where the migrating reactant is a base and the coreactant is an acid, or the migrating reactant is an acid and the coreactant is a base. The reaction of an acid with a base yields a salt usually of a neutral pH. After all of the coreactant is reacted, the migrating reactant can react with the non-migratory ionomer dye in the colorant layer 6. For example, one suitable reaction is an acid/base reaction where the migrating reactant is a base and the neutralizing agent is an acid.

Another type of reaction that can occur that is similar in nature and can occur in the neutralizing layer 7 is an oxidation/reduction reaction. In this case, the migrating reactant can be a reduced species and the neutralizing agent can be the oxidizing agent (or vice versa). When the two species interact, the reduced species becomes oxidized until the entire oxidizing agent is depleted. The migrating reactant can then migrate to the colorant layer 6 and interact with the non-migratory form of the colorant.

The timing layer 8 can be a separate layer or can be combined with the neutralizing layer 7 depending on the preferred timing of the time indicator application. It can include a pressure sensitive adhesive, hydrogel, plasticized polymer resin such as an acrylic, urethane, styrene, polyester or any other similar material. It may contain plasticizers that lower the Tg of the resin and allow the reactant to migrate. The timing layer 8 must allow the migrating reactant to diffuse through itself. The thickness, selection of migrating reactant and timing layer composition will be the main control of the timing for the migration of the reactant.

The timing control for the time indicator is based on the diffusion of the reactant in the timing layer 8 and the neutralizing layer 7, the rate of neutralization in the neutralizing layer 7, and the time required to deplete the neutralizing agent in the neutralizing layer 7 based on the amount of materials, thickness and composition. The color changing process is completely separate. It is based on the diffusion of the migrating reactant to the non-migratory dye in the colorant layer 6, the rate of the non-migratory to migratory conversion of the dye, and the diffusion of the migratory dye in the colorant layer 6 and the opaque layer 5. The activation process is the third process. Activation occurs when the end user marries the front part 1 and the back part 2 together. The goal is to have a long timing process yet have a short color changing process. The result is a clear understanding of the expiration point.

EXAMPLE

It has been demonstrated that a long term time indicator would be possible using the transformation of a non-migrating dye to a migrating dye brought about by migration of an amine. Fast migrating Disperse Orange 3 was chemically modified as follows to a non-migratory dye. In a two neck round bottom flask (300 ml.) equipped with magnetic stir bar, reflux condenser, thermometer and a stirrer/heating mantle, were mixed equimolar amounts (0.02 to 0.05 moles) of Disperse Orange 3 dye (available from Aldrich, 95% dye) and formaldehyde/sodium bisulfite 1:1 adduct (available from Aldrich) in 200 ml. of 50% aqueous alcohol (distilled water and completely denatured alcohol (ethanol/methanol {100 parts}, 2-propanol {10 parts}, methyl isobutyl ketone {1 part}). The mixture was stirred and heated to reflux for approximately six hours, then left to cool to room temperature overnight. The copious reddish brown precipitate was filtered using a Buchner funnel and vacuum sidearm flask. The crude yield was greater than 100% (based on the weight of Disperse Orange 3 charged) after air drying overnight. The dried, crude, solid reaction product was dried for several hours on filter paper in a 120° C. oven to remove residual solvents. In direct contact with triethanolamine, the color of the reaction product changed back to orange, with subsequent migration and development of color through opaque color change layers.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A time indicator comprising:

a front part comprising an opaque layer and a colorant layer in contact with the opaque layer at an interface, the colorant layer comprising a matrix and a colorant in the matrix, the colorant having a non-migratory form in which the colorant does not migrate in the matrix to the interface and a migratory form in which the colorant migrates in the matrix to the interface; and a back part comprising a reactant capable of migrating in the colorant layer, wherein, when the front part and the back part are placed in contact, the reactant migrates into the colorant layer and reacts with the non-migratory form of the colorant converting the non-migratory form of the colorant to the migratory form of the colorant such that the migratory form of the colorant migrates to the interface and through the opaque layer to cause a visual color indication in the front part.

2. The time indicator of claim 1 wherein:

the non-migratory form of the colorant is an ionomer dye.

3. The time indicator of claim 2 wherein:

the matrix comprises a pressure sensitive adhesive.

4. The time indicator of claim 1 wherein:

the non-migratory form of the colorant includes an acid group, the reactant has a basic pH, and an acid-base reaction between the non-migratory form of the colorant and the reactant converts the non-migratory form of the colorant to the migratory form of the colorant.

5. The time indicator of claim 4 wherein:

the acid group is a sulfite group.

6. The time indicator of claim 4 wherein:

the reactant is an amine.

7. The time indicator of claim 1 wherein:

the front part further comprises a transparent layer in contact with the opaque layer at a surface of the opaque layer opposite the interface.

8. The time indicator of claim 7 wherein:

the transparent layer comprises a transparent substrate and a transparent adhesive providing adhesion between the transparent substrate and the opaque layer.

9. The time indicator of claim 1 wherein:

the front part further comprises a neutralizing layer in contact with the colorant layer at a surface of the colorant layer opposite the interface, the reactant is capable of migrating through the neutralizing layer to the colorant layer, and the neutralizing layer includes an amount of a coreactant that reacts with an amount of the reactant to form a reaction product such that at least a portion of the reactant entering the neutralizing layer does not migrate into the colorant layer.

10. The time indicator of claim 9 wherein:

the coreactant has a pH opposite to that of the reactant, and an acid-base reaction forms the reaction product.

11. The time indicator of claim 10 wherein:

the reactant is an amine, and the coreactant is an acid.

12. The time indicator of claim 9 wherein:

the reactant is a reduced species, the coreactant is an oxidizing agent, and an oxidation-reduction reaction forms the reaction product.

13. The time indicator of claim 9 wherein:

the front part further comprises a timing layer in contact with the neutralizing layer at a surface of the neutralizing layer opposite the colorant layer, and the reactant is capable of migrating through the timing layer to the neutralizing layer.

14. The time indicator of claim 13 wherein:

the timing layer comprises a material selected from the group consisting of pressure sensitive adhesives, hydrogels, polymer resins, and mixtures thereof.

15. The time indicator of claim 13 wherein:

the timing layer comprises a polymer resin and a plasticizer.

16. The time indicator of claim 1 wherein:
the back part further comprises a base substrate in contact with the reactant.

17. The time indicator of claim 1 wherein:
the opaque layer has an acidic pH, and
the colorant that migrates into the opaque layer undergoes a color change due to the acidic pH.

18. A time indicator comprising:
a front part comprising an opaque layer, a colorant layer in contact with the opaque layer at an interface, a neutralizing layer in contact with the colorant layer at a surface of the colorant layer opposite the interface, and a transparent layer in contact with the opaque layer at a surface of the opaque layer opposite the interface, wherein the colorant layer comprises a matrix and a colorant in the matrix, the colorant has a non-migratory form in which the colorant does not migrate in the matrix to the interface and a migratory form in which the colorant migrates in the matrix to the interface; and
a back part comprising a reactant capable of migrating in the colorant layer and the neutralizing layer,
wherein, when the front part and the back part are placed in contact, the reactant migrates into the neutralizing layer and an amount of the reactant reacts with an amount of a coreactant in the neutralizing layer to form a reaction product such that at least a portion of the reactant entering the neutralizing layer does not migrate out of the neutralizing layer, and
wherein unreacted reactant migrates into the colorant layer and reacts with the non-migratory form of the colorant converting the non-migratory form of the colorant to the migratory form of the colorant such that the migratory form of the colorant migrates to the interface and through the opaque layer to cause a visual color indication in the transparent layer.

19. The time indicator of claim 18 wherein:
the front part further comprises a timing layer in contact with the neutralizing layer at a surface of the neutralizing layer opposite the colorant layer, and
the reactant is capable of migrating through the timing layer to the neutralizing layer.

20. The time indicator of claim 18 wherein:
the reactant is a base, the coreactant is an acid, and an acid-base reaction forms the reaction product, and
the non-migratory form of the colorant is an ionomer dye.

21. The time indicator of claim 20 wherein:
the reactant is an amine, and
the ionomer dye includes a sulfite group.

22. The time indicator of claim 21 wherein:
the matrix comprises a pressure sensitive adhesive.

23. The time indicator of claim 20 wherein:
the reactant is included in a reactant layer comprising a pressure sensitive adhesive.

* * * * *